US012771729B2

(12) United States Patent
Fallihee et al.

(10) Patent No.: US 12,771,729 B2
(45) Date of Patent: Oct. 20, 2026

(54) MULTI-CLOUD ASSESSMENT FRAMEWORK FOR DYNAMIC CLOUD WORKLOADS

(71) Applicants: Michael Fallihee, Helena, MT (US); Davide Massarenti, Bothell, WA (US); Vigneshwaran Angamuthu, Chennai, WA (US)

(72) Inventors: Michael Fallihee, Helena, MT (US); Davide Massarenti, Bothell, WA (US); Vigneshwaran Angamuthu, Chennai, WA (US)

( * ) Notice: Subject to any disclaimer, the term of this patent is extended or adjusted under 35 U.S.C. 154(b) by 40 days.

(21) Appl. No.: 18/761,288

(22) Filed: Jul. 1, 2024

(65) Prior Publication Data

US 2026/0006079 A1 Jan. 1, 2026

(51) Int. Cl.
*H04L 9/40* (2022.01)
*G06F 11/34* (2006.01)

(52) U.S. Cl.
CPC .......... *H04L 63/20* (2013.01); *G06F 11/3476* (2013.01)

(58) Field of Classification Search
CPC ............................ H04L 63/20; G06F 11/3476
See application file for complete search history.

(56) References Cited

U.S. PATENT DOCUMENTS

| | | | | |
|---|---|---|---|---|
| 2010/0251385 | A1* | 9/2010 | Fellers | H04L 63/101 726/28 |
| 2024/0012921 | A1* | 1/2024 | Yannuzzi | G06F 21/6218 |
| 2024/0039958 | A1* | 2/2024 | Yannuzzi | H04L 63/20 |
| 2025/0126074 | A1* | 4/2025 | Rathnam | H04L 47/762 |
| 2025/0141931 | A1* | 5/2025 | Sanghvi | H04L 63/0227 |

* cited by examiner

*Primary Examiner* — Anh Nguyen

(57) ABSTRACT

A method of a implementing a multi-cloud assessment framework for dynamic cloud workloads comprising: defining a plurality of dynamic cloud workloads, wherein the plurality of dynamic cloud workloads are defined by a complex set of filters; assessments combine a workload with a set of one or more frameworks; executing a plurality of polices defined in the multi-cloud assessment framework against plurality of dynamic cloud workloads; receiving a plurality of violations based on executing a plurality of polices defined in the multi-cloud assessment framework against plurality of dynamic cloud workloads; and showing plurality of violations to a user.

9 Claims, 3 Drawing Sheets

200

MULTI-CLOUD ASSESSMENT FRAMEWORK FOR DYNAMIC CLOUD WORKLOADS

CLAIM OF PRIORITY

This application claims priority U.S. Provisional Patent Application No. 63/524,477, filed on Jun. 30, 2023, and titled MULTI-CLOUD ASSESSMENT FRAMEWORK FOR DYNAMIC CLOUD WORKLOADS. This provisional patent application is hereby incorporated by reference in its entirety.

BACKGROUND

Each of the leading cloud platforms has their own established framework for building well-architected applications. Understanding and implementing the best practices needed to align a customer's cloud workloads with these frameworks is key to improving the quality of applications and maintaining reliable, secure, resilient, cost-efficient, performant, and sustainable cloud infrastructure, as well as ultimately improving overall business success.

BRIEF SUMMARY OF THE INVENTION

A method of a implementing a multi-cloud assessment framework for dynamic cloud workloads comprising: defining a plurality of dynamic cloud workloads, wherein the plurality of dynamic cloud workloads are defined by a complex set of filters; assessments combine a workload with a set of one or more frameworks; executing a plurality of polices defined in the multi-cloud assessment framework against plurality of dynamic cloud workloads; receiving a plurality of violations based on executing a plurality of polices defined in the multi-cloud assessment framework against plurality of dynamic cloud workloads; and showing plurality of violations to a user.

Figure 1:
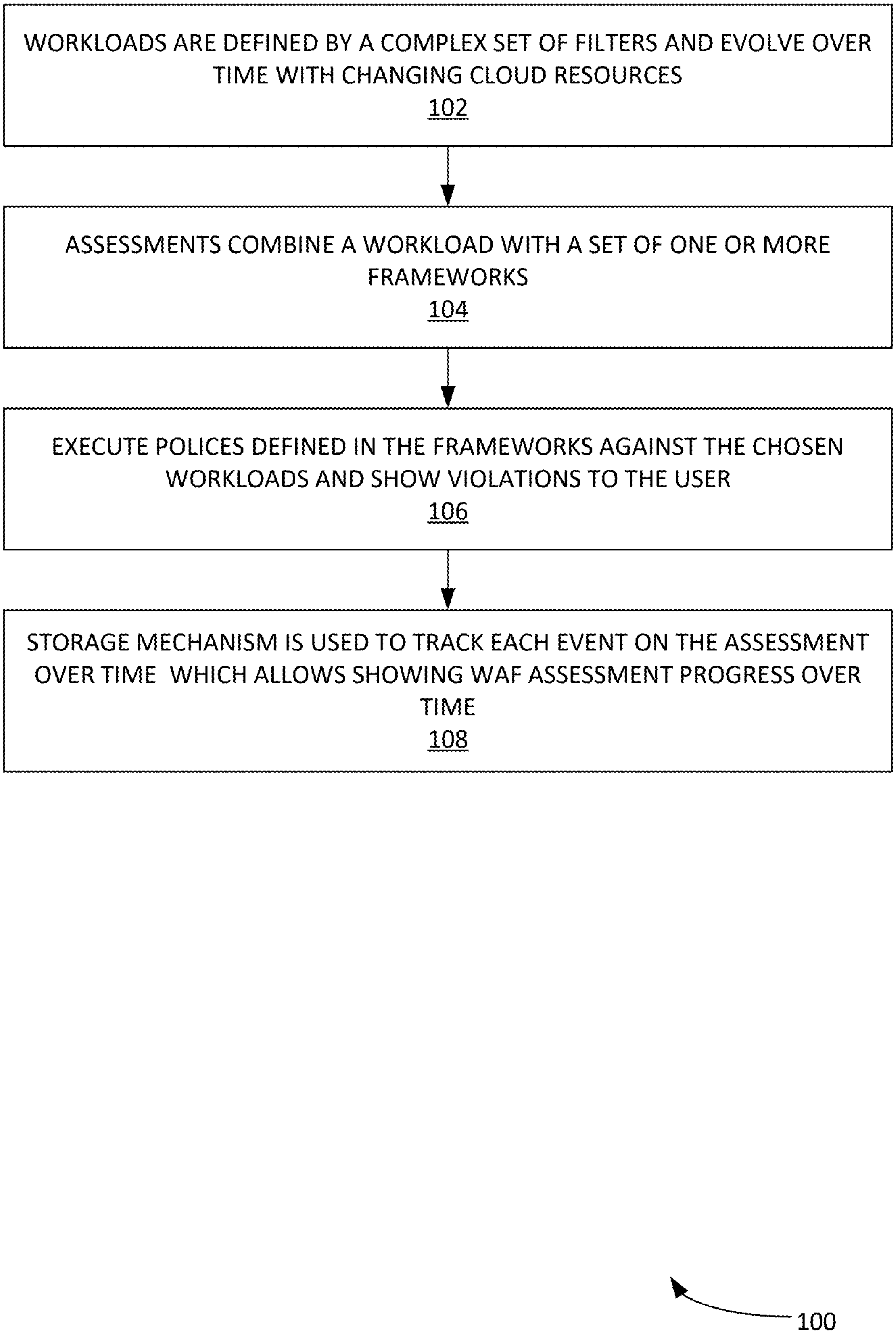
FIG. 1 illustrates an example process for multi-cloud assessment framework for dynamic cloud workloads, according to some embodiments.

The Figures described above are a representative set and are not an exhaustive with respect to embodying the invention.

DESCRIPTION

Disclosed are a system, method, and article of manufacture for a multi-cloud assessment framework for dynamic cloud workloads. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Amazon Web Services, Inc. (AWS) is an on-demand cloud computing platform(s) and API ( ). These cloud-computing web services can provide distributed computing processing capacity and software tools via AWS server farms. AWS can provide a virtual cluster of computers, available all the time, through the Internet. The virtual computers can emulate most of the attributes of a real computer, including hardware central processing units (CPUs) and graphics processing units (GPUs) for processing; local/RAM memory; hard-disk/SSD storage; a choice of operating systems; networking; and pre-loaded application software such as web servers, databases, and customer relationship management (CRM).

Microsoft Azure (e.g. Azure as used herein) is a cloud computing service operated by Microsoft for application management via Microsoft-managed data centers. It provides software as a service (Saas), platform as a service (PaaS) and infrastructure as a service (IaaS) and supports many different programming languages, tools, and frameworks, including both Microsoft-specific and third-party software and systems.

Cloud computing architecture refers to the components and subcomponents required for cloud computing. These components typically consist of a front-end platform (fat client, thin client, mobile), back-end platforms (servers, storage), a cloud-based delivery, and a network (Internet, Intranet, Intercloud). Combined, these components can make up cloud computing architecture. Cloud computing architectures and/or platforms can be referred to as the 'cloud' herein as well.

Cloud resource model (CRM) provides ability to define resource characteristics, Hierarchy, dependencies, and its action in a declarative model and embed them in Open API specification. CRM allows both humans and computers to understand and discover capabilities and characteristics of cloud service and its resources.

Cyber security is the protection of computer systems and networks from information disclosure, theft of, or damage to their hardware, software, or electronic data, as well as from the disruption or misdirection of the services they provide.

Deep learning is part of a broader family of machine learning methods based on artificial neural networks with representation learning. Learning can be supervised, semi-supervised or unsupervised.

Deep neural network (DNN) is an artificial neural network (ANN) with multiple layers between the input and output layers. There are different types of neural networks, but they always consist of the same components: neurons, synapses, weights, biases, and functions.

Generative artificial intelligence or generative AI is a type of artificial intelligence (AI) system capable of generating text, images, or other media in response to prompts. Generative models learn the patterns and structure of the input data, and then generate new content that is similar to the training data but with some degree of novelty (e.g. rather than only classifying or predicting data).

Hyperscalers can be large cloud service providers. Hyperscalers can be the owners and operators of data centers where these horizontally linked servers are housed.

Multi-cloud refers to a company utilizing multiple cloud computing services from various public vendors within a single, heterogeneous architecture. This approach can enhance cloud infrastructure capabilities and optimizes costs. It can also refer to the distribution of cloud assets, software, applications, etc. across several cloud-hosting environments.

Query Builder provides a graphical user interface for creating SQL queries. Query Builder can enable the building of one or more SQL queries (e.g. without the need for manual SQL coding, etc.)

Well-Architected Framework (WAF) can provide various key concepts, design principles, and architectural best practices for designing and running workloads in a specified cloud-computing platform. A cloud-platform's WAF can be used to provide guidance for improving and/or managing a specified cloud/hyperscaler system.

Example Systems and Methods

A multi-cloud governance platform is provided that empowers enterprises to rapidly achieve autonomous and continuous cloud governance and compliance at scale. Multi-cloud governance platform is delivered to end users in the form of multiple product offerings, bundled for a specific set of cloud governance pillars based on the client's needs. Example multi-cloud governance platform's offerings and associated cloud governance pillars are now discussed.

The multi-cloud governance platform can provide FinOps as a solution offering that is designed to help an entity develop a culture of financial accountability and realize the benefits of the cloud faster. The multi-cloud governance platform SecOps as a solution offering designed to help keep cloud assets secure and compliant. The multi-cloud governance platform is a solution offering designed to help optimize cloud operations and cost management in order to provide accessibility, availability, flexibility, and efficiency while also boosting business agility and outcomes. The multi-cloud governance platform provides a compass that is designed to help an entity adopt best practices according to well-architected frameworks, gain continuous visibility, and manage risk of cloud workloads with assessments, policies, and reports that allow an administrator to review the state of applications and get a clear understanding of risk trends over time.

Cloud Governance Pillars that can be implemented by the multi-cloud governance platform are now discussed. The multi-cloud governance platform can enable governing of cloud assets involves cost-efficient and effective management of resources in a cloud environment while adhering to security and compliance standards. There are several factors that can be involved in a successful implementation of cloud governance. The multi-cloud governance platform has encompassed all these factors into its cloud governance pillars. The following table explains the key cloud governance pillars developed by Multi-cloud governance platform.

The multi-cloud governance platform utilizes various operations that provide the capability to operate and manage various cloud resources efficiently using various features such as automation, monitoring, notifications, activity tracking.

The multi-cloud governance platform utilizes various security operations that enable management of the security governance of various cloud accounts and identify the security vulnerabilities and threats and resolve them.

The multi-cloud governance platform utilizes various manages cost. The multi-cloud governance platform enables users to create a customized controlling mechanism that can control a customer's cloud expenses within budget and reduce cloud waste by continually discovering and eliminating inefficient resources.

The multi-cloud governance platform utilizes various access operations. The multi-cloud governance platform utilizes various allows administrators to configure secure access of resources in a cloud environment and protect the users' data and assets from unauthorized access.

The multi-cloud governance platform utilizes various resource management operations. The multi-cloud governance platform enables users to define, enforce, and track the resource naming and tagging standards, sizing, and their usage by region. It also enables a customer to follow consistent and standard practices pertaining to resource deployment, management, and reporting.

The multi-cloud governance platform utilizes various compliance actions. The multi-cloud governance platform guides users to assess a cloud environment for its compliance status against standards and regulations that are relevant to an organization-ISO, NIST, HIPAA, PCI, CIS, FedRAMP, AWS Well-Architected framework, and custom standards.

The multi-cloud governance platform utilizes various self-service operations. The multi-cloud governance platform enables administrators to configure a simplified self-service cloud consumption model for end users that are tied to approval workflows. It enables an entity to automate repetitive tasks and focus on key deliverables.

The multi-cloud governance platform continuously assess the state of the customer's cloud workloads against well-architected frameworks to manage risk and embrace best practices. The multi-cloud governance platform includes a compass functionality that designed to help adopt best practices, gain continuous visibility, and manage risk for cloud workloads with assessments, policies, and reports that allow a customer to review the state of a customer's applications and get a clear understanding of risk trends over time. Further, it automatically discovers issues and provides actionable insights for remediation, simplifying and streamlining the process of assessing, improving, and maintaining cloud workloads. The multi-cloud governance platform can onboard cloud accounts and manage workloads. In this way, the multi-cloud governance platform supports well-architected frameworks (WAF).

Compass helps ensure user workloads are optimized as part of a strong cloud strategy in the following key areas: Automate discovery and remediate at scale Discovering issues across best practice areas for user cloud workloads can be difficult and time-consuming, which is why the multi-cloud governance platform implements auto-discovery and remediation features. This helps improve user productivity for detecting any issues in a cloud account or workloads and provides those insights for you to look into and remediate at scale. Compass can enable collaboration with multiple teams and enable gathering information and collecting evidence for best practices can present challenges around collaboration. Since it's usually not a single person doing the assessment, but a group of people across different teams, the multi-cloud governance platform provides built-in collaboration features to make assessing user workloads easier. Compass can be used to validate across multi-cloud workloads. The multi-cloud governance platform helps make it possible to validate best practices across multiple clouds by providing a single pane of glass to do a well-architected review across diverse workloads. The multi-cloud governance platform also supports a multi-cloud well architected framework for workloads that span across more than one cloud provider. Compass can classify best practices. Cloud best practices can fall into multiple categories. As part of Compass, the multi-cloud governance platform provides built-in pillars respective to each cloud platform (AWS, Azure, etc.) that organize best practices into relevant areas of focus, such as operations, security, sustainability, and more. The multi-cloud governance platform include these pillars to helps users clearly define which areas they need to focus on and guide you in terms of next steps to move towards a well-architected cloud infrastructure.

Compass can enable map policies to workloads best practices for different cloud platforms are reinforced in the multi-cloud governance platform by built-in policies, which are mapped directly to various best practices. These policies help identify any violations in a workload based on a particular best practice. Policies come pre-loaded and pre-mapped, but you can also create and map a customer's policies. This enables you to validate user workloads against best practices with more ease and control. Automate best practices even with built in best practice classification and policies, validating user workloads against best well-architected frameworks can still require manual work.

The multi-cloud governance platform Compass maps relevant policies to identify violations against certain best practice and can automate most of the work needed to validate user workloads and identify any violations, reducing the amount of overhead and effort needed on a user. Built-in suggestions for remediation can be provided. For many of The multi-cloud governance platform's automated policies, any identified violations that appear as part of an assessment will come with a suggested remediation to address it. These suggestions appear directly to the user in the multi-cloud governance platform web portal, making it easy to both find and fix any issues with user cloud workloads.

Built-in evidence tracking is provided. The multi-cloud governance platform can keep track of what steps were taken to implement best practices and address any violations is a key part of the cloud optimization process. The multi-cloud governance platform Compass can simplify and streamline this part of the process by providing built-in comment and file attachment features for each best practice item included in an assessment. Users can add evidence directly in the assessment to show what was done to meet certain best practices, as well as create a milestone once an assessment is complete to log a snapshot of a workload that can be referenced later.

Clear assessment workflow is implemented by the multi-cloud governance platform. Progress through assessments with ease with a built-in workflow that helps you ensure you follow each step of the assessment process and account for each best practice item along the way. The multi-cloud governance platform can start an assessment, go through the questions, remediate any violations it finds, then reach a finishing point where you're ready to create a milestone. Export assessment reports In addition to being able to monitor user assessment results directly in the multi-cloud governance platform web portal, you can also export results as reports (e.g. PDF or image file). This makes it easy to share the results of an assessment with other members of a team, or across departments.

The multi-cloud governance platform can integrate with AWS Well-Architected (WA). The multi-cloud governance platform Compass supports one-directional integration with AWS Well-Architected, meaning it can send data directly from The multi-cloud governance platform to AWS. When a user completes an assessment, whatever best practices the user provides answers can be synced to AWS so that results show there as well. This is helpful for keeping information consistent across both The multi-cloud governance platform and AWS environments. The multi-cloud governance platform's mission is to not only help with assessing cloud posture, but to provide a clear path to realizing well-architected workloads.

SecOps refers to the combination of efforts from security and operations teams to monitor the security posture of cloud assets, assess their risks, and protect them. As your enterprise scales and adopts cost-effective cloud computing models, security operations will play a foundational role in mitigating risks across your business environment. This is becoming increasingly important amid the growing rate of cyberattacks, like ransomware, targeting businesses of all sizes. SecOps is a solution offering designed to help keep your cloud assets secure and compliant. It accomplishes this through cloud-native tools and custom APIs, including autonomous security operations, unified visibility into threats and vulnerabilities, and compliance assessments-applied across your entire multi-cloud inventory. Some key features and benefits of SecOps include: Automated processes that can be run across the entire multi-cloud inventory to achieve continuous cloud compliance with evolving industry and regulatory standards. Unified visibility into security threats and vulnerabilities, and the ability to remediate them. Compliance assessments you can run using CoreStack's unique Abstracted Cloud Compliance Control (AC3) engine for industry standards, such as ISO, FedRAMP, NIST, HIPAA, PCI DSS, CIS Azure, CIS AWS, and AWS Well-Architected Framework.

A framework is made up of a set of best practices that are identified through nature, type, classification, etc. If the nature of the best practice is Manual, then a user has to validate manually whether a best practice is implemented correctly or not. If the nature of the best practice is Automated, then it means that policies are mapped to it and the execution of policies provide clarity on the state of best practices. Every assessment is associated with a workload and a framework and the user can go to the Assessments>Workload Assessments>View Details screen to view all the assessment details.

Multi-Cloud Assessment Framework for Dynamic Cloud Workloads

FIG. 1 illustrates an example process 100 for implementing a multi-cloud assessment framework for dynamic cloud workloads, according to some embodiments. In step 102, workloads are defined by a complex set of filters (e.g. a query builder) and evolve over time with changing cloud resources. In step 104, assessments combine a workload with a set of one or more frameworks. Process 100 can execute polices defined in the frameworks against the chosen workloads and show violations to the user in step 106. A storage mechanism is used to track each event on the assessment over time (e.g. user changes status, leaves comments, adds attachments, policies are executed, etc.) which allows showing WAF assessment progress over time in step 108.

Figure 2:
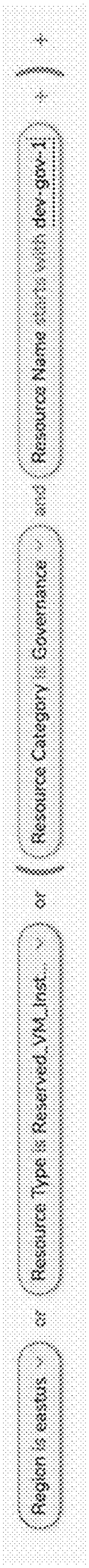
FIG. 2 illustrates an example of statement for implementing a multi-cloud assessment framework for dynamic cloud workloads, according to some embodiments.

FIG. 2 illustrates an example of statement 200 for implementing a multi-cloud assessment framework for dynamic cloud workloads, according to some embodiments.

Additional Example Computer Architecture and Systems

Figure 3:
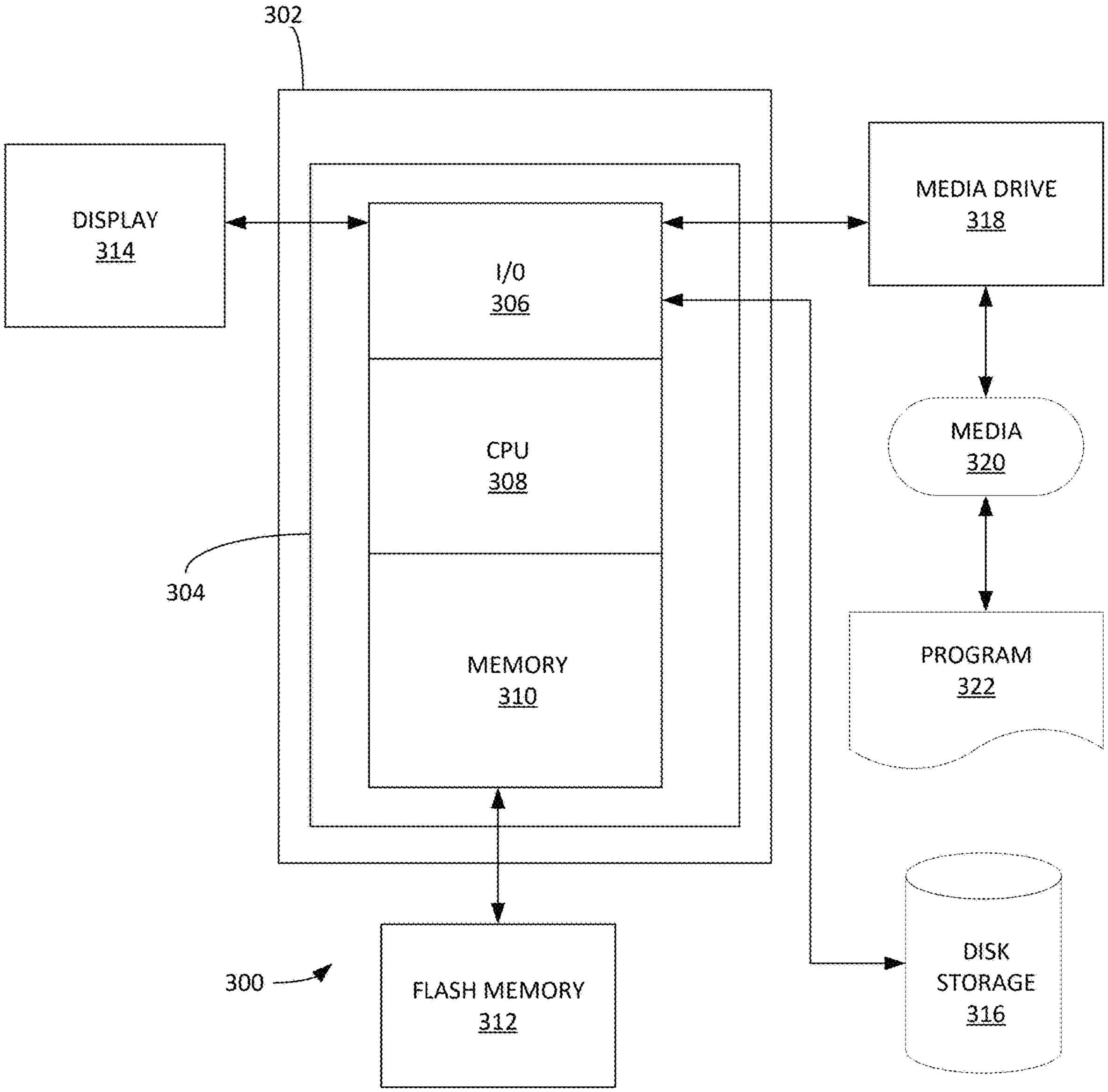
FIG. 3 is a block diagram of a sample computing environment that can be utilized to implement various embodiments.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A computer-implemented method for implementing a multi-cloud assessment framework for dynamic cloud workloads, the method comprising:

defining, by a multi-cloud governance platform, a plurality of dynamic cloud workloads, wherein each dynamic cloud workload is defined by a complex set of filters generated using a query builder, and wherein each dynamic cloud workload evolves over time based on changing cloud resources;

generating, by the multi-cloud governance platform, an assessment by associating at least one dynamic cloud workload of the plurality of dynamic cloud workloads with one or more Well-Architected Frameworks, wherein each Well-Architected Framework comprises a plurality of best-practice items;

identifying, by the multi-cloud governance platform, an automated best-practice item of the plurality of best-practice items;

mapping, by the multi-cloud governance platform, one or more policies to the automated best-practice item;

executing, by the multi-cloud governance platform, the one or more policies against cloud resources included in the at least one dynamic cloud workload;

identifying, by the multi-cloud governance platform, a plurality of violations based on execution of the one or more policies against the cloud resources included in the at least one dynamic cloud workload;

storing, by a storage mechanism, assessment event data for the assessment over time, wherein the assessment event data is associated with at least one best-practice item or at least one violation of the plurality of violations, and wherein the assessment event data comprises policy execution data, evidence data added during the assessment, and a status change associated with the at least one best-practice item or the at least one violation;

creating, by the multi-cloud governance platform, a milestone once the assessment is complete, wherein the milestone logs a snapshot of the at least one dynamic cloud workload that can be referenced later; and causing, by the multi-cloud governance platform, a user interface to display the plurality of violations and Well-Architected Framework assessment progress over time based on the stored assessment event data.

2. The computer-implemented method of claim 1, wherein the one or more policies comprise pre-loaded policies that are pre-mapped to corresponding automated best-practice items of the one or more Well-Architected Frameworks.

3. The computer-implemented method of claim 1, wherein the one or more policies comprise a customer-created policy mapped to the automated best-practice item.

4. The computer-implemented method of claim 1, wherein the evidence data comprises a user comment associated with the automated best-practice item.

5. The computer-implemented method of claim 1, wherein the evidence data comprises a file attachment associated with the automated best-practice item.

6. The computer-implemented method of claim 1, further comprising causing the user interface to display a remediation suggestion for at least one violation of the plurality of violations.

7. The computer-implemented method of claim 1, further comprising exporting assessment results for the assessment as a report.

8. The computer-implemented method of claim 1, further comprising synchronizing completed assessment data for the assessment with an external Well-Architected Framework environment.

9. The computer-implemented method of claim 1, wherein the assessment progress indicates progress through the plurality of best-practice items of the one or more Well-Architected Frameworks.

* * * * *